F. W. CARLSON.
PLUMBING SYSTEM.
APPLICATION FILED MAR. 27, 1919.
1,417,660.
Patented May 30, 1922.
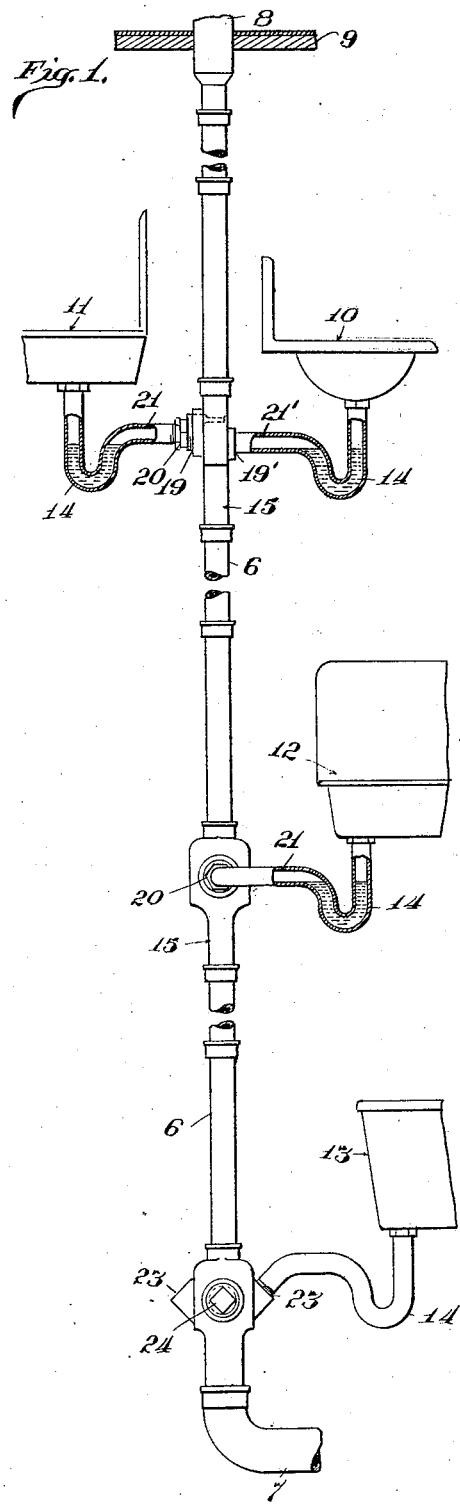
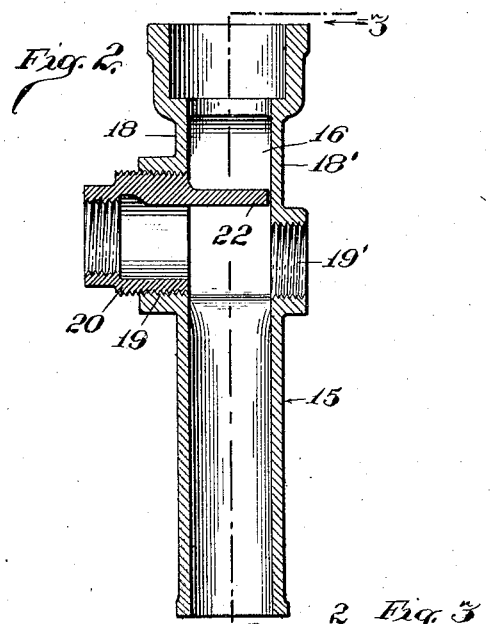
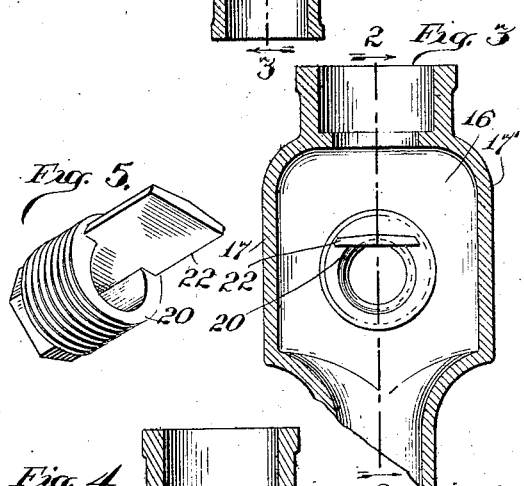
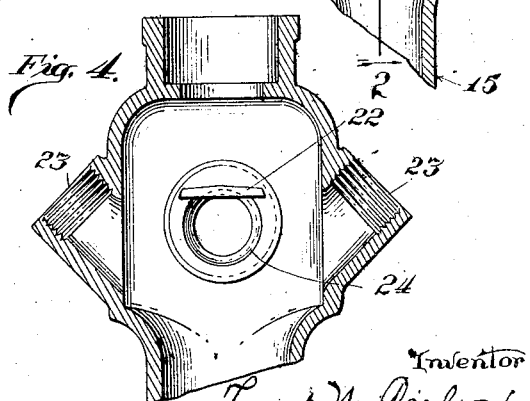
Inventor
Frank W. Carlson

UNITED STATES PATENT OFFICE.

FRANK W. CARLSON, OF CHICAGO, ILLINOIS.

PLUMBING SYSTEM.

1,417,660.        Specification of Letters Patent.      Patented May 30, 1922.

Application filed March 27, 1919. Serial No. 285,553.

*To all whom it may concern:*

Be it known that I, FRANK W. CARLSON, a citizen of the United States, residing at Chicago, in the county of Cook and State of Illinois, have invented certain new and useful Improvements in Plumbing Systems, of which the following is a specification.

It has been common practice in plumbing systems in the past to provide each lavatory and other fixture with a self sealing water trap to prevent the gases and odors from escaping into the room, and also to provide a vent pipe in connection with the waste pipe to preserve the water seals at the fixtures and to permit escape of the gases outside the building. But in actual practice this vent pipe often becomes a source of danger instead of providing the sanitary ventilation for which it is intended. The vent pipe has often been found to be choked with rust and with grease and other waste matter that accumulates in the pipe from back pressure and other causes, and the danger lies in the fact that this clogging of the vent pipe may remain concealed for some time. Meanwhile the water seal is drawn out of the trap by siphoning action in the waste pipe and the poisonous gases and noxious odors are permitted to escape through the fixture into the room.

My invention has for its objects to dispense with the vent pipe, to provide a plumbing system in which the gases and odors will escape through the waste pipe, and to prevent the water seal in the trap for each fixture connected with the waste pipe from being siphoned out by the passage of waste through the waste pipe.

My invention also has for its object to reduce the cost of installing a plumbing system by eliminating the vent pipe usually associated with the waste pipe and to provide for checking the flow of waste through the waste pipe at intervals to break the force thereof and to prevent any siphoning action on the water seals of the fixtures.

And the invention also has for its object to provide an improved connection whereby one or more fixtures can be easily and quickly connected with the waste pipe, and which will permit access to the pipe for cleaning and other purposes.

In the accompanying drawings I have illustrated one embodiment of the invention and referring thereto;

Fig. 1 illustrates the invention as it may be installed in actual use.

Fig. 2 is a sectional view on line 2—2 of Fig. 3.

Fig. 3 is a sectional view on line 3—3 on Fig. 2.

Fig. 4 is a sectional view similar to Fig. 3 illustrating another form of the connection.

Fig. 5 is a detail perspective view of the hollow plug shown in Figs. 2 and 3.

Referring to the drawings, 6 is a waste pipe which connects with the sewer pipe 7 and extends upward through the building and has an outlet 8 above the roof 9. The usual fixtures, such as a wash bowl 10, sinks 11, 12 and wash tub 13 are connected with the waste pipe, each fixture being provided according to the common practice with the self sealing water trap 14.

In the drawings I have only shown a few fixtures connected with the waste pipe, but it will be understood that the invention is just as well adapted for high buildings, such as hotels, apartment houses and office buildings in which fixtures are attached to the waste pipe at each story, as it is to smaller buildings, such as private dwellings.

The connection comprises a short pipe section 15 interposed in the waste pipe and forming a part thereof and provided with an enlarged chamber 16 between its ends. This chamber is substantially rectangular in shape, greater in width from side to side than from front to rear, and formed by the outwardly extending side walls 17—17' and the parallel front and rear walls 18—18'. Threaded inlet openings 19—19' are provided in the front and rear walls of the connection (Figs. 2—3) for the fixture pipes. In one of these openings, 19 for example, I provide a hollow plug 20 exteriorly threaded to engage the threaded opening 19, and interiorly threaded to receive the fixture pipe 21. This plug has a projection 22 which extends inward across the chamber 16 to form a check or baffle in the path of waste falling down through the pipe. The projection 22 is located adjacent the top of the plug and above the opening therein, the latter being eccentrically disposed in the plug so that the projection may be located below the top of the plug sufficiently to have a width approximating the diameter of the waste pipe and without obstructing the opening in the plug. The opening 19' in the rear wall of the chamber is smaller than the opening 19 in the front wall and corresponds in size with the opening in the plug to receive the fixture pipe 21'. This opening 19' is eccentric to the opening 19 and is disposed below the projection 22. Thus both fixture pipe openings are disposed below and adjacent to the projection 22 which protects them against the passage of waste in the waste pipe and prevents siphoning of the water seals out of the traps.

If only one fixture is to be connected to the waste pipe the connection may be provided with opening 19' and a solid plug, or the opening 19' may be omitted or plugged and connection made with the hollow plug 20 as shown.

I may construct the connection as illustrated in Fig. 4 with inlet openings 23 at the sides, a solid rear wall and a solid plug 24. This form of connection is suitable where the waste pipe connects with the sewer pipe and for connection with the wash tubs in the basement of the building. The plug can be removed to permit access to the sewer pipe for cleaning the pipe whenever it becomes clogged with grease and other waste matter.

In practice the waste passing down through the waste pipe is checked and broken up and diverted at each connection by the projection 22. This projection is located above the fixture pipe openings so that the waste is divided thereby into two streams and diverted to opposite sides of the chamber away from the fixture openings. By thus interrupting and breaking and diverting the flow of waste, I prevent it from siphoning the water seals out of the fixture traps. This enables the use of the waste pipe to carry off the gases and odors without danger of having the water seals in the fixture pipes destroyed and permitting the gases and odors to escape through the fixtures into the rooms. Thus I avoid the necessity of using a vent pipe to prevent the waste from siphoning out the water seals, and I also avoid the danger of using vent pipes which have been known to become clogged with rust and waste and then permit the water seals to be siphoned out of the traps without the knowledge of the occupants of the building.

My invention greatly reduces the cost of a waste pipe installation and at the same time provides a reliable sanitary installation. The waste water flowing interruptedly down the waste pipe subjects the system to a flushing and cleansing action which keeps the waste pipe free and unobstructed and in a sanitary condition.

I am aware that changes in the form and proportion of parts and in the details of construction of the connection and in the arrangement and disposition of the connection in the system may be made without departing from the spirit or sacrificing the advantages of the invention and I reserve the right to make all such changes as fairly fall within the scope of the accompanying claims.

I claim:

1. In a waste pipe of a plumbing system having an opening in one side, a plug threadedly engaging said opening and having an eccentrically disposed opening therein, and a baffle plate extending from the upper portion of said plug transversely in the pipe to check and break the flow of waste in the pipe.

2. In a waste pipe of a plumbing system having oppositely disposed openings therein, a plug arranged in one opening, and a baffle plate extending from the upper portion of said plug transversely in the pipe above the other opening to check and break the flow of waste in the pipe.

3. In a waste pipe of a plumbing system having oppositely disposed openings therein, a plug threadedly engaging one of said openings and having eccentrically disposed opening therein, and a flat projection extending from the upper portion of the plug transversely in the pipe and above the other opening to check and break the flow of waste in the pipe.

4. A waste pipe of a plumbing system having oppositely disposed openings therein, and a transverse baffle plate in the pipe above said openings to check and break the flow of waste in the pipe.

5. A waste pipe of a plumbing system having a sidewise enlarged chamber therein, and a projection disposed in said chamber in the path of water flowing therethrough to baffle the flow of waste in the pipe.

6. A waste pipe of a plumbing system having a sidewise enlarged chamber therein, and a flat horizontal projection disposed transversely in said chamber in the londitudinal axis of the pipe to baffle the flow of waste in the pipe.

7. A waste pipe of a plumbing system having an enlarged chamber therein and an opening in one side thereof, a plug threadedly engaging said opening, and a projection carried by said plug and extending transversely in the chamber in the longitudinal axis of the pipe to baffle the flow of waste in the pipe.

8. A waste pipe of a plumbing system having a sidewise enlarged chamber therein and an opening in one side of said chamber, a plug threadedly engaging said opening, and a projection on the plug extending transversely in the chamber at substantially a right angle to and in the longitudinal axis of the pipe.

9. A waste pipe of a plumbing system having a plurality of chambers therein and an opening in one side of each chamber, a plug threadedly engaging each of said openings, a flat projection on each of said plugs extending transversely in each chamber at substantially a right angle to and in the longitudinal axis of the pipe, and a fixture connected to said pipe below each of said projections.

10. A waste pipe of a plumbing system having a chamber therein of greater width from side to side than from front to rear, and a flat projection extending transversely in said chamber in the longitudinal axis of the pipe to check and divide the flow of waste in the pipe.

FRANK W. CARLSON.

Witnesses:
WM. O. BELT,
M. A. KIDDIE.